US007231152B2

(12) United States Patent
Kim et al.

(10) Patent No.: US 7,231,152 B2
(45) Date of Patent: Jun. 12, 2007

(54) INFRARED REMOTE CONTROL RECEIVER (IRCR) HAVING SEMICONDUCTOR SIGNAL PROCESSING DEVICE THEREIN

(75) Inventors: Suk Ki Kim, Seoul (KR); Joon Jea Sung, Seoul (KR); Geun Soon Kang, Seoul (KR)

(73) Assignee: Silicon Communications Technology Co., Ltd. (KR)

( * ) Notice: Subject to any disclaimer, the term of this patent is extended or adjusted under 35 U.S.C. 154(b) by 702 days.

(21) Appl. No.: 10/404,966

(22) Filed: Apr. 1, 2003

(65) Prior Publication Data

US 2003/0190775 A1 Oct. 9, 2003

(30) Foreign Application Priority Data

Apr. 8, 2002 (KR) ...................... 10-2002-0019044
Apr. 18, 2002 (KR) ...................... 10-2002-0021347
Dec. 30, 2002 (KR) ...................... 10-2002-0087413

(51) Int. Cl.
*H04B 10/06* (2006.01)

(52) U.S. Cl. ...................... 398/208; 398/202; 398/209; 330/308

(58) Field of Classification Search ................ 398/202, 398/209, 208; 298/209; 330/308
See application file for complete search history.

(56) References Cited

U.S. PATENT DOCUMENTS 5,331,210 A * 7/1994 McCarroll ................... 327/58
5,892,609 A * 4/1999 Saruwatari .................. 398/202
6,041,084 A * 3/2000 Nagaraj ....................... 375/317
6,151,150 A * 11/2000 Kikuchi ....................... 398/209
6,826,390 B1 * 11/2004 Tamura ................... 455/226.1
6,915,083 B1 * 7/2005 Hamilton et al. ........... 398/202
2002/0098818 A1 * 7/2002 Yokogawa et al. ......... 455/255

OTHER PUBLICATIONS

"A variable gain CMOS Amplifier with exponential gain control," Symposium on VLSI Circuits Digest of Technical Papers, pp. 146-149 by Mangelsdorf.*

"A Low-Distortion BiCMOS Seventh Order Bessel Filter Operating at 2.5 V Supply," IEEE Journal of Solid-State Circuits, vol. 31, No. 3, Mar. 1996 pp. 321-330 to Yang et al.*

* cited by examiner

*Primary Examiner*—Kenneth Vanderpuye
*Assistant Examiner*—Ken Malkowski
(74) *Attorney, Agent, or Firm*—Cantor Colburn LLP

(57) ABSTRACT

Disclosed is an infrared remote control receiver comprising a photo diode for converting an optical signal to an electrical signal, a semiconductor signal processing device for receiving the electrical from the photo diode, eliminating noise components from the electrical signal output from the photo diode and generating a pulse signal corresponding to a remote control signal transmitted from a remote control transmission device, and a micro computer for receiving the pulse signal from the semiconductor signal processing device and performing a remote control operation instructed by a user of the remote control transmission device by decoding the received pulse signal, wherein the semiconductor signal processing device is fabricated using CMOS devices fabrication processes.

14 Claims, 12 Drawing Sheets

100

120

INFRARED REMOTE CONTROL RECEIVER (IRCR) HAVING SEMICONDUCTOR SIGNAL PROCESSING DEVICE THEREIN

BACKGROUND OF THE INVENTION

1. Field of the Invention

The present invention relates to an infrared remote control receiver (IRCR), and more particularly to an IRCR with a semiconductor signal processing device, which is designed to be fabricated using complementary metal oxide semiconductor (CMOS) fabrication processes.

2. Description of the Related Art

An IRCR includes a semiconductor signal processing device having an amplifier therein. Noise reduction characteristic of such an amplifier is an important factor to determine sensitivity of an IRCR. Conventional amplifier in a semiconductor signal processing device of an IRCR is typically fabricated using bipolar junction transistor (BJT) fabrication processes or bipolar complementary metal oxide semiconductor (BiCMOS) fabrication processes to obtain an excellent noise reduction characteristic. A semiconductor signal processing device with an amplifier, which is fabricated by using BJT fabrication processes, is excellent in noise reduction characteristic but is disadvantageous in terms of adjustment of small currents less than 1 nA. Further, an amplifier in a semiconductor signal-processing device must have a large capacitor to stably process signals of several tens of KHz signal band. Accordingly, in the case of fabricating such a semiconductor signal processing device with an amplifier using BJT fabrication processes, the semiconductor signal processing device occupies a large area in a chip and consumes a large amount of powers. Accordingly, the signal processing device has a large chip size. Further, a microcomputer electrically connected to the signal processing device in an IRCR is mostly fabricated using CMOS fabrication processes. Accordingly, it is difficult to combine such a microcomputer mostly fabricated using CMOS fabrication processes and a signal processing device designed to be fabricated using BJT fabrication processes into a single chip because their fabrication processes are not compatible.

Further, an envelope signal detecting circuit in a conventional semiconductor signal processing device of an IRCR generally detects an envelope signal in one direction, a positive direction or a negative direction. However, to improve signal detection efficiency, bi-directionally detected differential envelope signals are needed. To bi-directionally detect envelope signals, two envelope signal-detecting circuits are needed and therefore configuration of such semiconductor signal processing device becomes complicated.

SUMMARY OF THE INVENTION

It is a feature of an embodiment of the present invention to provide an infrared remote control receiver (IRCR) with a semiconductor signal processing device designed to be fabricated using CMOS fabrication processes and being excellent in noise reduction characteristic.

It is another feature of an embodiment of the present invention to provide an IRCR with a semiconductor signal processing device capable of stably amplifying signals when external signals out of allowed ranges is input thereto.

It is further another feature of an embodiment of the present invention to provide an IRCR with a semiconductor signal processing device having an envelope signal detecting circuit with high envelope signals detection efficiency.

It is yet further another feature of an embodiment of the present invention to provide an IRCR with a semiconductor signal processing device capable of stably generating a pulse signal even when a low voltage signal is input thereto.

In accordance with the present invention, there is provided an infrared remote control receiver comprising a photo diode for converting an optical signal to an electrical signal, a semiconductor signal processing device for receiving the electrical from the photo diode, eliminating noise components from the electrical signal output from the photo diode and generating a pulse signal corresponding to a remote control signal transmitted from a remote control transmission device, and a micro computer for receiving the pulse signal from the semiconductor signal processing device and performing a remote control operation instructed by a user of the remote control transmission device by decoding the received pulse signal, wherein the semiconductor signal processing device is fabricated only using CMOS devices fabrication processes.

Preferably, the semiconductor signal processing device may comprise (a) an amplifier for receiving the output of the photo diode and amplifying the received output, (b) a variable gain amplifier for receiving an output of the amplifier and amplifying the noise components and original signal components in the received output signal from the amplifier with different gains, (c) a filter for passing carrier frequency components from output signal of the variable gain amplifier circuit, (d) an envelope signal detecting circuit for abstracting envelope signals from the output of the filter, (e) a hysteresis comparator for comparing the envelope signals output from the envelope signal detecting circuit and generating the pulse signal corresponding to the remote control signal, and (f) an automatic gain controller for receiving outputs of the envelope signal detecting circuit and separately transmitting a signal with the original signal components and a signal with the noise components to the variable gain amplifier circuit.

Preferably, the amplifier may comprise (a) a first capacitor having a first end for receiving the output signal of the photo diode and a second end connected to a first node, (b) a second capacitor having a first end for receiving a reference voltage and a second end connected to a second node, (c) a first operational amplifier having a first input terminal connected to the first node, a second input terminal connected to the second node, and a third input terminal for receiving a common mode feed back signal, wherein the first operational amplifier amplifies signal difference between a high frequency signal input to the first input terminal and a reference signal input to the second input terminal, generates a first output signal and a second output signal and transmits the first and second output signals to a third node and a fourth node, respectively, (d) a common mode feed back circuit for receiving the first output signal and the second output signal of the first operational amplifier from the third node and the fourth node, respectively, generating the common mode feed back signal and transmitting the common mode feed back signal to the third input terminal of the first operational amplifier, (e) a third capacitor connected between the first node and the third node, (f) a first MOS transistor controlled by a predetermined voltage and connected in parallel to the third capacitor, (g) a fourth capacitor connected between the second node and the fourth node; and (h) a second MOS transistor connected in parallel to the fourth capacitor and controlled by a predetermined voltage.

Preferably, the amplifier may comprise (a) a first capacitor having a first end receiving the output signal of the photo diode and a second end connected to a first node, (b) a second capacitor having a first end receiving a reference voltage and a second end connected to a second node, (c) a first operational amplifier for amplifying a high frequency signal and a reference signal, generating a first and second output signals and transmitting the first and second output signals to a third and fourth nodes, respectively, the first operational amplifier having a first input terminal connected to the first node, a second input terminal connected to the second node and a third input terminal receiving a common mode feed back signal, (d) a common mode feed back circuit for receiving the first output signal of the first operational amplifier from the third node, receiving the second output signal of the first operational amplifier from the fourth node, generating the common mode feed back signal and transmitting the common mode feed back signal to the third input terminal of the first operational amplifier, (e) a third capacitor connected to the first node and the third node, (f) a gm cell having a first input terminal connected to the third node, a second input terminal connected to the fourth node, a first output terminal connected to the first node and a second output terminal connected to the second node; and (g) a fourth capacitor connected between the second node and the fourth node.

In accordance with another aspect of the present invention, there is provided an envelope signal detecting circuit comprising an amplifier for amplifying an input signal, and an envelope signal abstracting unit for generating a first envelope signal after receiving an output signal of the amplifier, wherein a minimum voltage level of the output signal of the amplifier is maintained greater than a first reference voltage.

In accordance with further another aspect of the present invention, there is provided an envelope signal detecting circuit comprising an amplifier for amplifying an input signal, a first envelope signal abstracting unit for generating a first envelope signal by receiving an output signal of the amplifier, and a second envelope signal abstracting unit for generating a second envelope signal by receiving an output of the first envelope signal abstracting circuit, wherein the minimum voltage of the output signal of the amplifier is maintained greater than a first reference voltage.

BRIEF DESCRIPTION OF THE DRAWINGS

The above and other features and advantages of the present invention will become readily apparent to those of ordinary skill in the art by describing in detail preferred embodiments thereof with reference to the attached drawings in which.

DETAILED DESCRIPTION OF THE INVENTION

Figure 1:
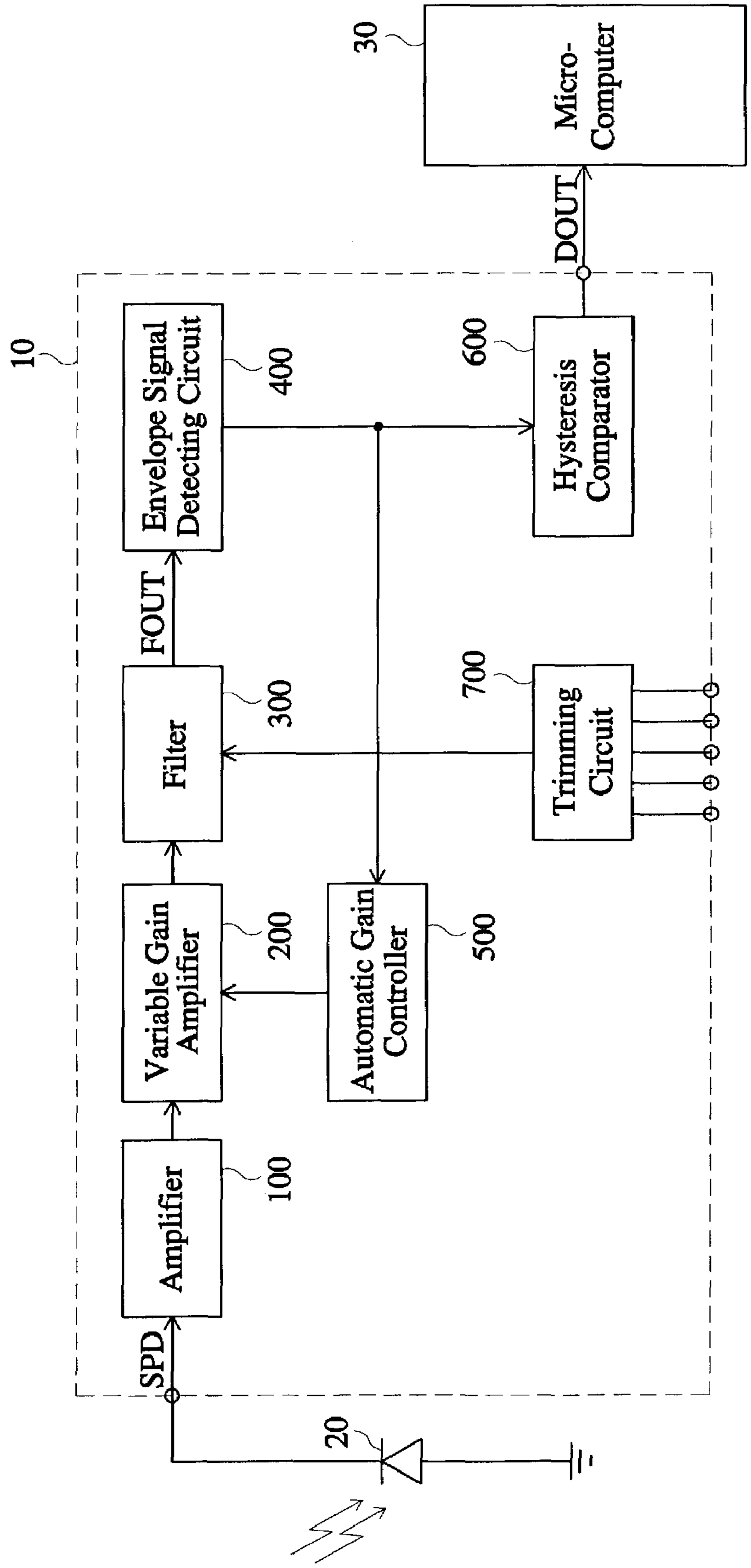
FIG. 1 is a block diagram of an IRCR in accordance with the present invention.

Korean Patent Application No. 2002-87413, filed on Dec. 30, 2002, and entitled: "Infrared Remote Control Receiver With Semiconductor Signal Processing Device Designed With Only CMOS PROCESS," is incorporated by reference herein in its entirety.

Hereinafter, the present invention will be described in detail by describing preferred embodiments of the present invention with reference to the accompanying drawings. Like reference numerals refer to like elements throughout the drawings.

FIG. 1 illustrates an infrared remote control receiver (IRCR) in accordance with the present invention.

Referring to FIG. 1, an IRCR comprises a photo diode 20 for converting an optical signal to an electrical signal, a semiconductor signal processing device 10 for eliminating noise components from the electrical signal output from the photo diode and generating a pulse signal corresponding to a remote control signal transmitted from a remote control transmission system, and a microcomputer 30 for performing a remote control operation which is ordered by a user by receiving and decoding the pulse signal from the semiconductor signal processing device 10.

The semiconductor signal processing device 10 comprises an amplifier 100 which receives a signal from the photo diode 20 and amplifies the received signal, a variable gain amplifier 200 which amplifies the amplified signal output from the amplifier 100 with different gains for original signal components and noise components, a filter 300 which receives outputs of the variable gain amplifier 200 and transmits only carrier frequency components in the received output signal of the variable gain amplifier 200, an envelope signal detecting circuit 400 which abstracts envelope signals from output signals of the filter 300, a hysteresis comparator 600 which receives the envelope signals output from the envelope signal detecting circuit 400, compares the received envelope signals with each other and generates a pulse signal corresponding to a remote control signal, an automatic gain controller 500 which receives outputs of the envelope signal detecting circuit 400 and separately transmitting a signal consisted of the original signal components and a signal consisted of the noise components in the output signals of the envelope signal detecting circuit 400 to the variable gain amplifier 200, and a trimming circuit 700 which receives a high current signal from an external terminal of the semiconductor remote control receiver 10 and adjusts center frequency of the filter 300.

The operation of the IRCR shown in FIG. 1 will be described below.

A remote control signal, an optical signal, transmitted from a remote control signal transmission device (not shown) is received by the photo diode 20 in the remote control receiver and is converted to an electrical signal by the photo diode 20. The amplifier 100 amplifies the electrical signal output from the photo diode 20 and the amplified signal is transmitted to the variable gain amplification circuit 200, which amplifies signal components (original signal) and noise components (noise signal) in the amplified signal with different gains. The filter 300 filters the signals output from the variable gain amplification circuit 200, so that only carrier frequency components pass the filter 300 and the other components are blocked. The outputs of the filter 300 are input to an envelope signal detecting circuit 400 in which envelope signals are abstracted. The abstracted envelope signals are input to a hysteresis comparator 600 in which the envelope signals are compared with each other and from which a pulse signal corresponding to the remote control signal is generated. The pulse signal output from the hysteresis comparator 600 is input to an automatic gain controller 500 which makes the variable gain amplification circuit 200 to separately or differently adjust gains of the original signal and the noise signal. The pulse signal DOUT output from the hysteresis comparator 600 is transmitted to the microcomputer 30. The microcomputer 30 performs a remote control operation, which is instructed by a user by receiving the remote control signal from the semiconductor signal processing device 10. Then, the trimming circuit 700 receives a high current signal from an external option pin of the semiconductor signal processing device 10 and adjusts the center frequency of the filter 300 by trimming a resistor forming the trimming circuit 700 using a fusing or Zener zapping method.

Figure 2:
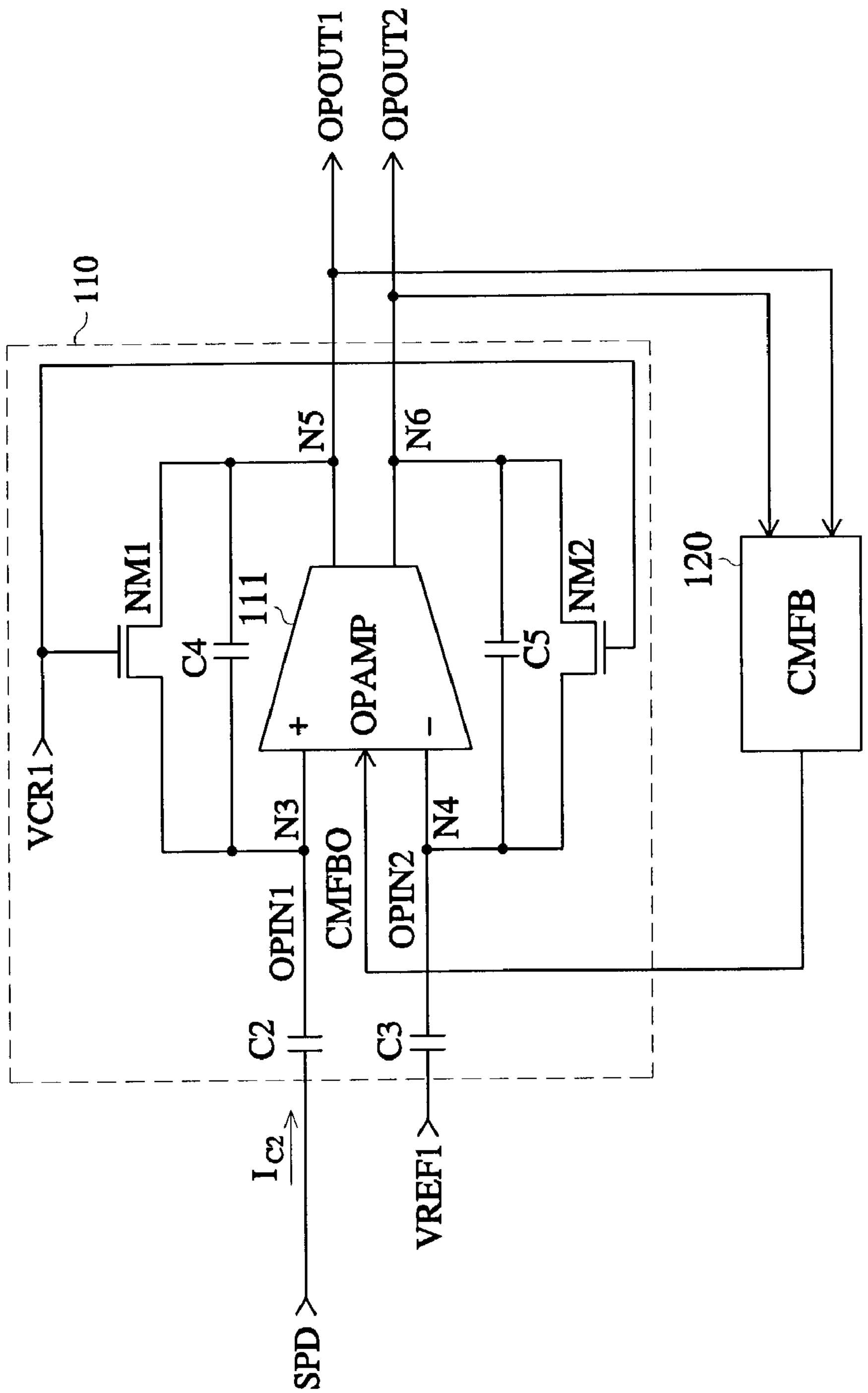
FIG. 2 is a circuit diagram of a semiconductor signal processing device of an IRCR in accordance with an embodiment of the present invention, wherein the semiconductor signal processing device includes a high pass amplifier which comprises MOS switches.

FIG. 2 illustrates the amplifier of the semiconductor signal processing device shown in FIG. 1, wherein the semiconductor signal processing device has a high pass amplifier designed using MOS switches. The amplifier comprises a high pass amplifier 110 and a common mode feedback circuit 120. The amplifier further comprises a capacitor C2 having a first end to which a photo diode voltage signal SPD is applied and a second end connected to a node N3, and a capacitor C3 having a first end to which a reference voltage VREF1 is applied and a second end connected to a node N4. The amplifier yet further comprises an operational amplifier 111 having a first input terminal connected to the node N3, a second input terminal connected to the node N4 and a third input terminal for receiving a common mode feedback signal CMFBO. The operational amplifier 111 amplifies signal difference between a high frequency signal OPIN1 input to the first input terminal and a reference signal OPIN2 input to the second input terminal, generates a first and second output signals OPOUT1, OPOUT2 and transmits the output signals OPOUT1, OPOUT2 to nodes N5 and N6, respectively. The amplifier yet further comprises a common mode feedback circuit 120 which receives the first and second output signals OPOUT1, OPOUT2 of the operational amplifier 111 through the nodes N5 and N6, respectively, generates the common mode feedback signal CMFBO and transmits it to the third input terminal of the operational amplifier 111, a first capacitor-transistor combination circuit being comprised of a capacitor C4 and a MOS transistor NM1 which are connected in parallel to each other between the node N3 and the node N5 and a second capacitor-transistor combination circuit being comprised of a capacitor C5 and a MOS transistor NM2 which are connected in parallel to each other between the node N4 and a node N6, wherein a predetermined voltage VCR1 is commonly applied to gate electrodes of the MOS transistors NM1 and NM2.

The operation of the amplifier shown in FIG. 2 will be described below.

The amplifier shown in FIG. 2 acts both as a high pass filter and an amplifier for amplifying the photo diode voltage signal SPD. The NMOS transistors NM1, NM2 have their own gates to which a predetermined voltage signal VCR1 is applied, and act as resistors by being operated in linear region. The NMOS transistors NM1, NM2 have the same size. Further, capacitances of the capacitors C2 and C4 are the same as capacitances of the capacitors C3 and C5, respectively. Gain of the amplifier 100 is determined by capacitance ratio of the capacitor C2 to the capacitor C4. If the NMOS transistors NM1 and NM2 have the same resistance RM, high pass frequency is determined by the resistance RM of the NMOS transistors NM1, NM2 and the capacitors C2 and C4. The common mode feedback circuit 120 receives the first and second outputs OPOUT1, OPOUT2 of the operational amplifier 111 and generates the common mode feedback signal CMFBO. The amplifier 100 has transmission characteristic explained below.

Given that "SPD" designates the photo diode voltage signal and "s" designates complex operator, current $I_{C2}$ flowing through the capacitor C2 is obtained by multiplying the complex operator s, capacitance of the capacitor C2 and voltage of the photo diode voltage signal SPD. That is, $I_{C2}$=s×C2×SPD. Further, voltage of the output voltage signal OPOUT1 is expressed as an equation below.

$$OPOUT1=\frac{RM}{1+s\times RM\times C4}\times s\times C2\times SPD$$

Accordingly, gain G of the amplifier 100 is obtained by an equation below.

$$G=\frac{OPOUT1}{SPD}=\frac{RM\times s\times C2}{1+s\times RM\times C4}$$

Assuming that s>>1/(RM×4), the gain G≈(C2/C4).

A high pass pole frequency fp is expressed as follows:

$$fp=\frac{1}{\sqrt{2\times\pi\times C4\times RM}}$$

In an application field of low operating speed, resistance, which determines pole frequency of an amplifier, ranges about several MΩ. Accordingly, in the case of implementing such amplifier having high resistance of several MΩ by an integrated circuit, the amplifier occupies a large area on a chip. However, as shown in FIG. 2, in the case of implementing resistors by NMOS transistors NM1, NM2, the amplifier occupies a small area. Further, as shown in FIG. 2, by arranging a capacitor-transistor combination circuits between the first input terminal and the first output terminal of the operational amplifier 111 and between the second input terminal and the second output terminal of the operation amplifier 111, respectively, the amplifier 100 may differentially operate.

Figure 3:
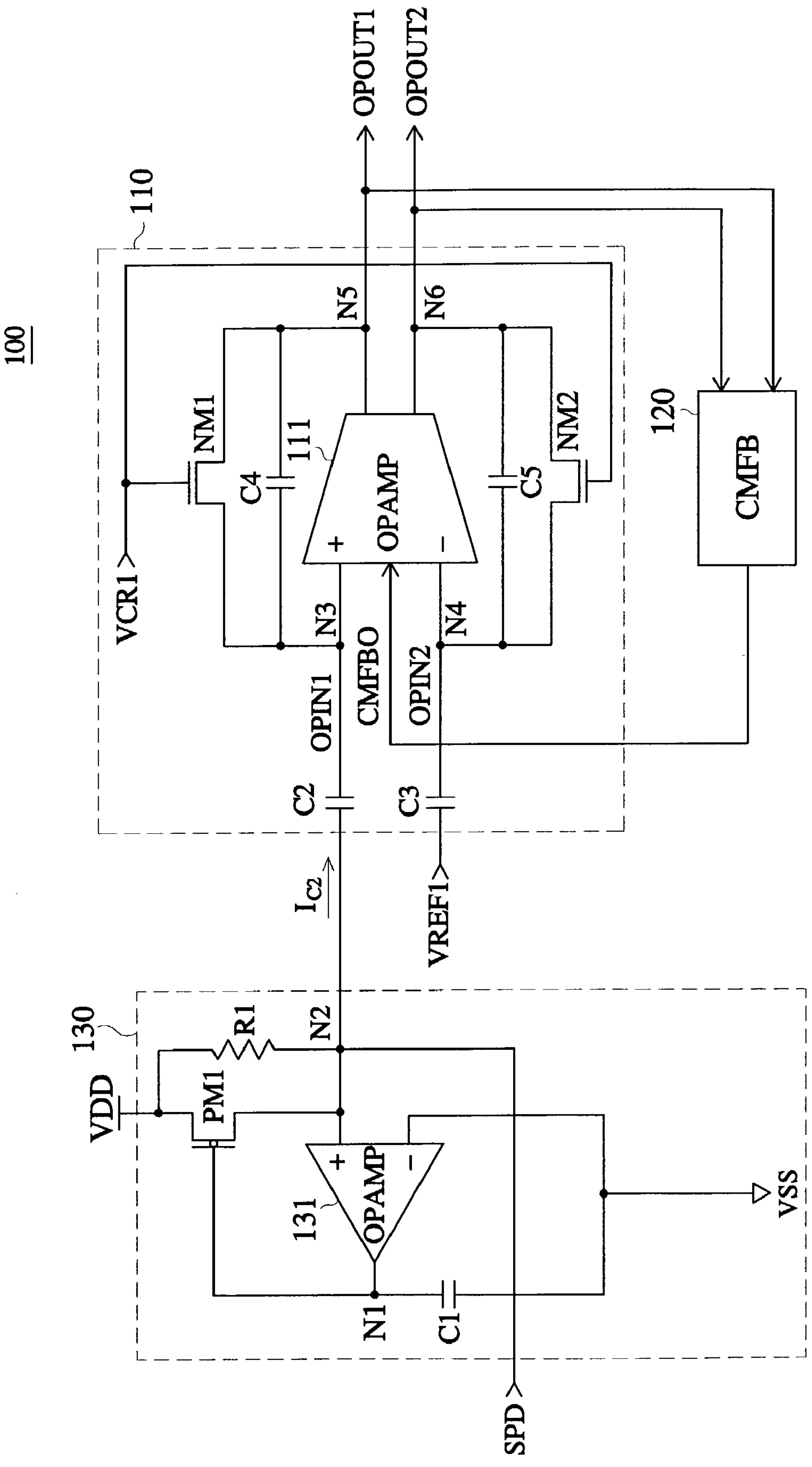
FIG. 3 is a circuit diagram of a semiconductor signal processing device of an IRCR in accordance with an alternative embodiment of the present, wherein the semiconductor signal processing device includes a high pass amplifier which comprises MOS switches and has a direct current (DC) level adjusting circuit.

FIG. 3 illustrates an amplifier of a semiconductor signal processing device with a high pass amplifier in accordance with the present invention, wherein the amplifier shown in FIG. 3 additionally comprises a direct current (DC) level adjusting circuit at an input stage of the amplifier shown in FIG. 2 and is designed using MOS switches.

The DC level adjusting circuit 130 comprises a PMOS transistor PM1 having a source to which a power supply voltage VDD is applied, a gate electrode connected to a node N1, and a drain electrode connected to a node N2. The DC level adjusting circuit 130 further comprises a resistor R1 having a first end to which a power supply voltage VDD is applied and a second end connected to the node N2, an operational amplifier 131 which has a first input terminal connected to the node N2, a second input terminal connected to a ground voltage VSS and an output terminal connected to the node N1, and a capacitor C1 connected to the node N1 and the ground voltage VSS, wherein the photo diode voltage signal SPD is applied to the node N2.

The operation of the amplifier shown in FIG. 3 will be described below.

First, the operation of the DC level adjusting circuit 130 will be described. Generally, as environment light is brighter, DC of a photo diode in the IRCR increases. Such increased current of the photo diode happens to be greater than an allowed input current of the amplifier. Accordingly, the DC level adjusting circuit 130 is needed to adjust the DC level input to an input terminal of the amplifier circuit. The photo diode voltage signal SPD is an electrical signal output from a photo diode (not shown) in an IRCR. If an IRCR is in bright environment, DC current flowing through a photo diode in the IRCR increases but voltage of the photo diode voltage signal SPD applied to the node N2 decreases. If voltage applied to the node N2 becomes below zero, an output of the first operational amplifier 112, i.e. voltage of the node N1, becomes logic "low" level, and the MOS transistor PM1 is turned, so that voltage of the node N2 is pulled up and becomes greater than zero. By the DC level adjusting circuit 130, input impedance R1 with respect to an infrared optical signal becomes R1, and input impedance with respect to DC signal of the photo diode becomes zero. Accordingly, even if DC flowing through the photo diode (not shown) increases to a level greater than an allowed level, gain of the infrared optical signal may not be decreased.

Accordingly, even though the input signal to the amplifier is greater than allowed range, the amplifier may safely amplify the input signal due to the DC level adjusting circuit 130.

Figure 4:
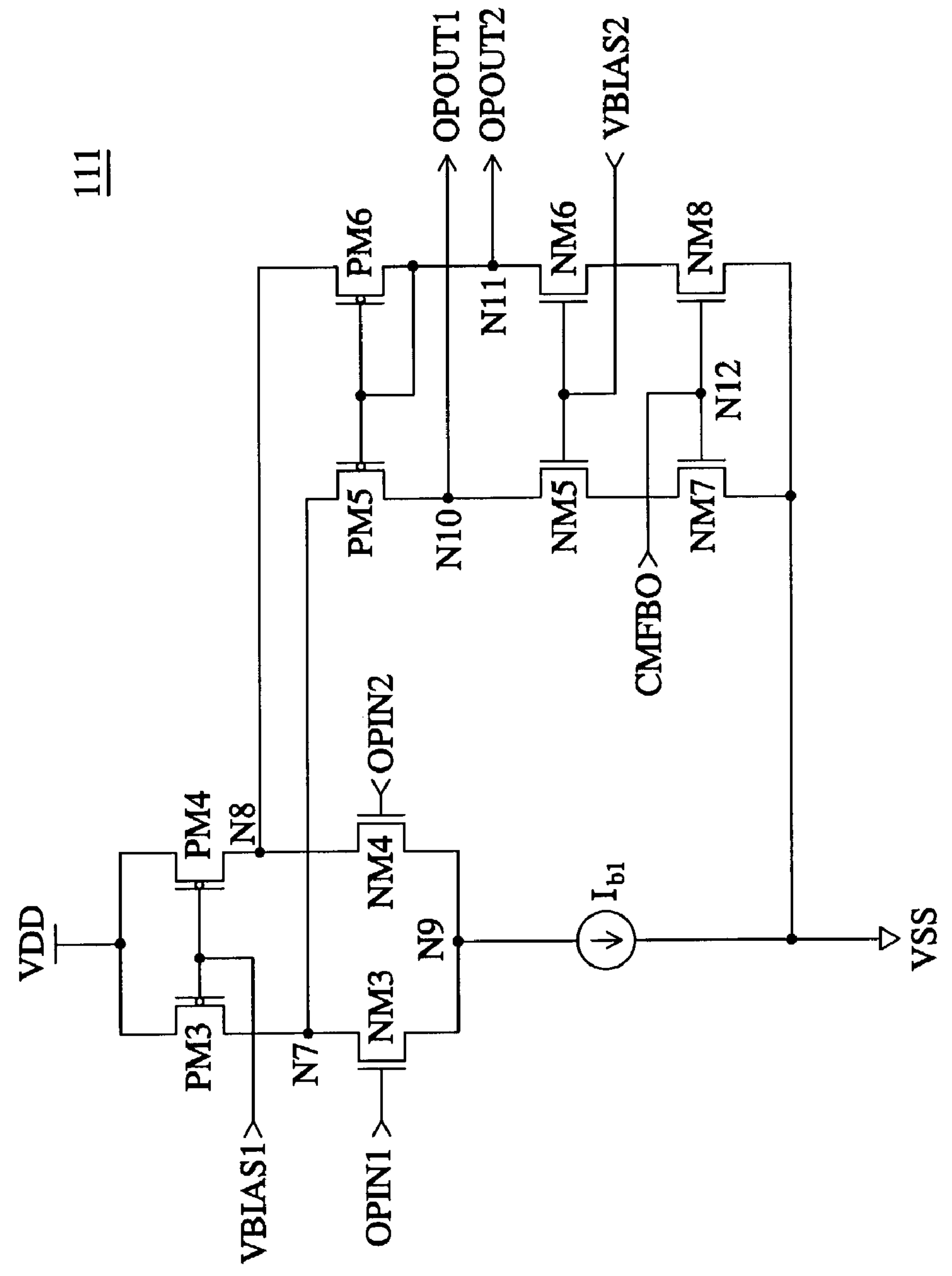
FIG. 4 is a circuit diagram of an operational amplifier for use in the high pass amplifier of the semiconductor signal processing device in accordance with the present invention.

FIG. 4 illustrates the operational amplifier 111, which is shown in FIG. 2 and FIG. 3, in detail. The operation amplifier 111 comprises a PMOS transistor PM3 with a source to which a power supply voltage VDD is applied, a drain connected to a node N7 and a gate to which a bias voltage VBIAS1 is applied, a PMOS transistor PM4 with a source to which a power supply voltage is applied, a drain connected to a node N8, and a gate to which the bias voltage VBIAS1 is applied, an NMOS transistor NM3 with a drain connected to a node N7, a source connected to a node N9 and a gate to which a first input signal OPIN1 of the operational amplifier is input, an NMOS transistor NM4 with a drain connected to the node N8, a source connected to the node N9 and a gate to which a second input signal OPIN2 of the operational amplifier is input, a current source Ib1 connected between the node N9 and a ground voltage VSS, a PMOS transistor PM5 with a source connected to the node N7, a gate connected to a node N11 and a drain connected to a node N10, a PMOS transistor PM6 with a source connected to the node N8, a gate and a drain which are connected to the node N11, an NMOS transistor NM5 with a drain connected to the node N10, a gate to which a bias voltage VBIAS2 is applied, an NMOS transistor NM7 with a drain connected to the source of the NMOS transistor NM5, a drain connected to a ground voltage VSS and a gate connected to a node N12, an NMOS transistor NM6 with a drain connected to the node N11, a gate to which a bias voltage VBIAS2 is input and an NMOS transistor NM8 with a drain connected to the source of the NMOS transistor NM6, a source connected to a ground voltage VSS and a gate connected to the node N12, wherein the common mode feed back signal CMFBO is applied to the node N12 and the first output signal OPOUT1 and the second output signal OPOUT2 of the operational amplifier 111 are output from the nodes N10 and N11, respectively.

As shown in FIG. 4, the operational amplifier 111 receives two input signals OPIN1, OPIN2 and one common mode feed back signal CMFBO, amplifies voltage difference between the two input signals OPIN1 and OPIN2, and generates two output signals OPOUT1, OPOUt2. As the input signal OPIN2, a reference voltage, a half power supply voltage VDD/2, is used and the input signal OPIN2 is applied to the operational amplifier 111 through a capacitor (not shown). As the input signal OPIN1, the photo diode voltage signal SPD, is input through a capacitor (not shown) to the operational amplifier 111. Further, when the operational amplifier normally operates, the two output signals OPOUT1, OPOUT have about a half power supply voltage VDD/2.

If voltage levels of the two output signals OPOUT1, OPOUT2 of the operational amplifier 111 become greater than the half power supply voltage VDD/2, voltage level of the common mode feed back signal CMFBO increases by the common mode feed back circuit. Further, if voltage level of the common mode feed back circuit increases, voltage levels of the two output signals OPOUT1, OPOUT2 are lowered.

If voltage levels of the two output signals OPOUT1, OPOUT2 of the operational amplifier 111 are lower than the half power supply voltage VDD/2, voltage level of the common mode feed back signal CMFBO is lowered by the operation of the common mode feed back circuit. Further, if voltage level of the common mode feed back signal CMFBO is lowered, voltage levels of the two output signals OPOUT1, OPOUT2 of the operational amplifier 111 increase.

Figure 5:
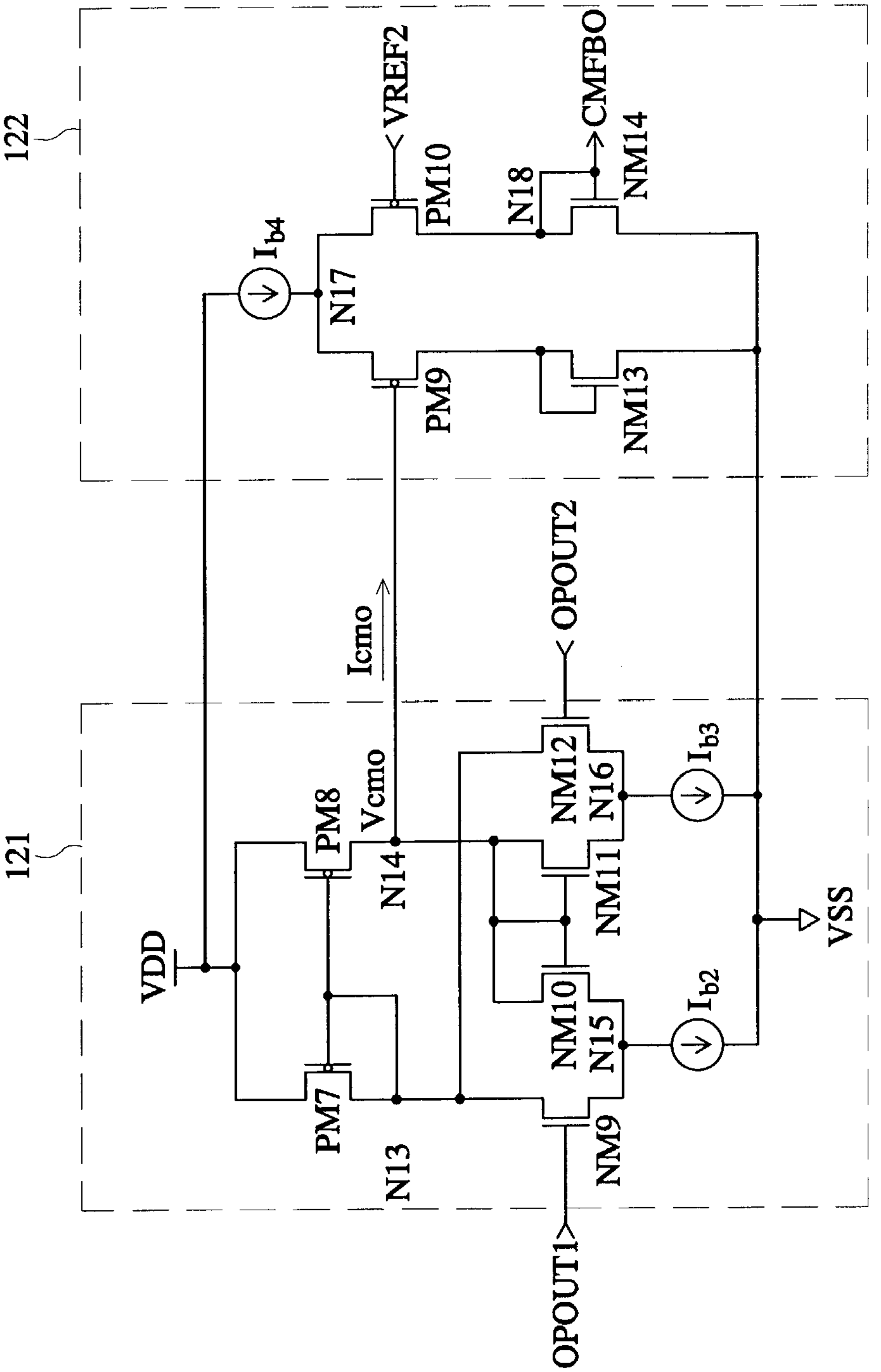
FIG. 5 is a common mode feedback circuit of the semiconductor signal processing device in accordance with the present invention.

FIG. 5 illustrates the common mode feed back circuit 120 shown in FIG. 2 and FIG. 3, wherein the common mode feed back circuit 120 comprises a common mode signal generator 121 and a common mode amplifier 122.

The common mode signal generator 121 comprises a PMOS transistor PM7 with a source connected to a power supply voltage VDD, a gate and drain commonly connected to a node N13, a PMOS transistor PM18 with a source connected to a power supply voltage VDD, a gate connected to a node N13 and a drain connected to a node N14, an NMOS transistor NM9 with a drain connected to the node N13, a source connected to a node N15 and a gate to which the first output signal OPOUT1 of the operational amplifier is applied, an NMOS transistor NM10 with a gate and drain commonly connected to the node N14 and a source connected to a node N15, a current source Ib2 connected between the node N15 and a ground voltage VSS, an NMOS transistor N11 with a gate and drain commonly connected to the node N14 and a source connected to a node N16, an NMOS transistor NM12 with a drain connected to the node N13, a source connected to a node N16 and a gate to which the second output signal OPOUT2 of the operational amplifier is applied, and a current source Ib3 connected between the node N16 and a ground voltage VSS, wherein an output voltage Vcmo of the common mode signal generator 121 is generated from the node N14.

The common mode amplifier 122 comprises a current source Ib4 connected between a power supply voltage VDD and a node N17, a PMOS transistor PM9 with a source connected to the node N17 and a gate connected to the node N14, an NMOS transistor NM13 with a gate and drain commonly connected to the drain of the PMOS transistor PM9 and a source connected to a ground voltage VSS, a PMOS transistor PM10 with a source connected to the node N17, a drain connected to a node N18 and a gate to which a reference voltage VREF2 is applied, and an NMOS transistor NM14 with a gate and drain commonly connected to the drain of the PMOS transistor PM10 and a source connected to a ground voltage VSS, wherein the common mode feed back signal CMFBO is generated from the node N18.

The operation of the common mode feed back circuit 120 will be described below.

The total amount of a current flowing through the drain of the NMOS transistor NM9 and a current flowing through the drain of the NMOS transistor NM12 is the same as an amount of a current flowing through the drain of the PMOS transistor PM7. An output current Icmo of the common mode signal generator 125 is obtained by subtracting a current flowing through the drain of the NMOS transistor NM10 and a current flowing through the drain of the NMOS transistor NM11 from a current flowing through the drain of the PMOS transistor PM8. Further, an output voltage Vcmo of the common mode signal generator 125 equals to the output current Icmo of the current mode signal generator 125 times an output impedance of the common mode signal generator 125. Assuming that transconductances gm of the transistors NM9, NM10, NM11 and NM12 are the same, a drain current $I_{D9}$ of the transistor NM9 is expressed as an equation, $I_{D9}$=gm×((OPOUT1−Vcmo)/2), a drain current of the transistor NM10 is expressed as an equation, $I_{D10}$=gm×((Vcmo−OPOUT1)/2), a drain current $I_{D11}$ of the NMOS transistor NM11 is expressed as an equation, $I_{D11}$=gm×((Vcmo−OPOUT2)/2), and a drain current $I_{D12}$ of the NMOS transistor NM12 is expressed as an equation, $I_{D12}$=gm×((OPOUT2−Vcmo)/2). An medium value $V_{CM}$ of the first and second input signals OPOUT1, OPOUT2 is expressed as an equation, $V_{CM}$=(OPOUT1+OPOUT2)/2, and the output current Icmo of the common mode signal generator 125 is obtained by a following equation.

$$Icmo=I_{D9}-I_{10}-I_{D11}+I_{D12}=gm\times(V_{CM}-Vcmo)$$

On the other hand, if the output impedance of the common mode signal generator 125 is Rout, the output voltage Vcmo of the common mode signal generator 125 is expressed as an equation, Vcmo=Icmo×Rout=gm×Rout×($V_{CM}$−Vcmo). Accordingly, the Vcmo is obtained by a following equation.

$$Vout=(gm\times Rout\times V_{CM})/(1+gm\times Rout)$$

When $gm\times Rout>>1$, $Vout\approx V_{CM}$

The common mode feed back circuit shown in FIG. 5 does not include passive elements such as resistors but only comprises MOS transistors. Accordingly, the common mode feed back circuit in accordance with the present invention occupies a small area on a chip.

Figure 6:
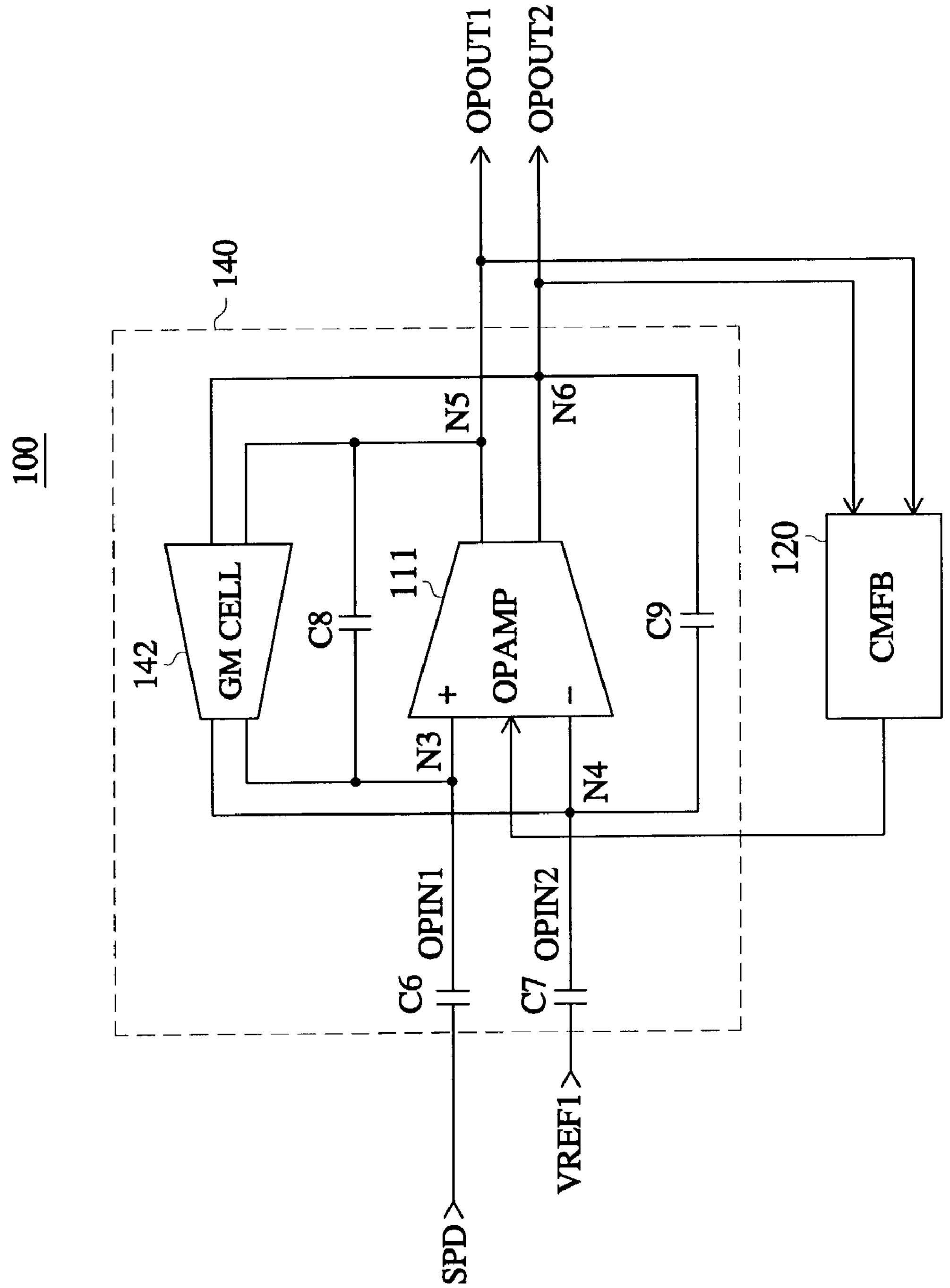
FIG. 6 is a circuit diagram of a semiconductor signal processing device of an IRCR in accordance with further alternative embodiment of the present invention, wherein the semiconductor signal processing device has a high pass amplifier designed using a gm cell.

FIG. 6 illustrates an amplifier with a high pass amplifier designed using a gm cell in accordance with the present invention. A gm cell 142 receives a first and second output signals OPOUT1, OPOUT2 of an operational amplifier 111 and generates two output signals which are transmitted to a first and second input nodes N3, N4 of the operational amplifier 111.

To process signals of low frequency band of several tens of kHz, a feed back resistor having high feed back resistance is needed. Accordingly, if the feed back resistor is implemented by a passive element, chip size of a semiconductor signal processing device is greatly increased. As shown in FIG. 6, in the case of implementing the feed back resistor by a gm cell operating at sub-threshold voltage, chip size of a signal processing device is reduced. Further, the high pass amplifier using a gm cell stably saturates its output signal and the output signal is not folded and distorted even in the case that a high voltage signal is input thereto. Accordingly, in the case of using amplifiers at a plurality of stages, such a high pass amplifier using a gm cell may be arranged at a later stage to amplify pre-amplified signals by fore stages of amplifiers without signal distortion.

Figure 7:
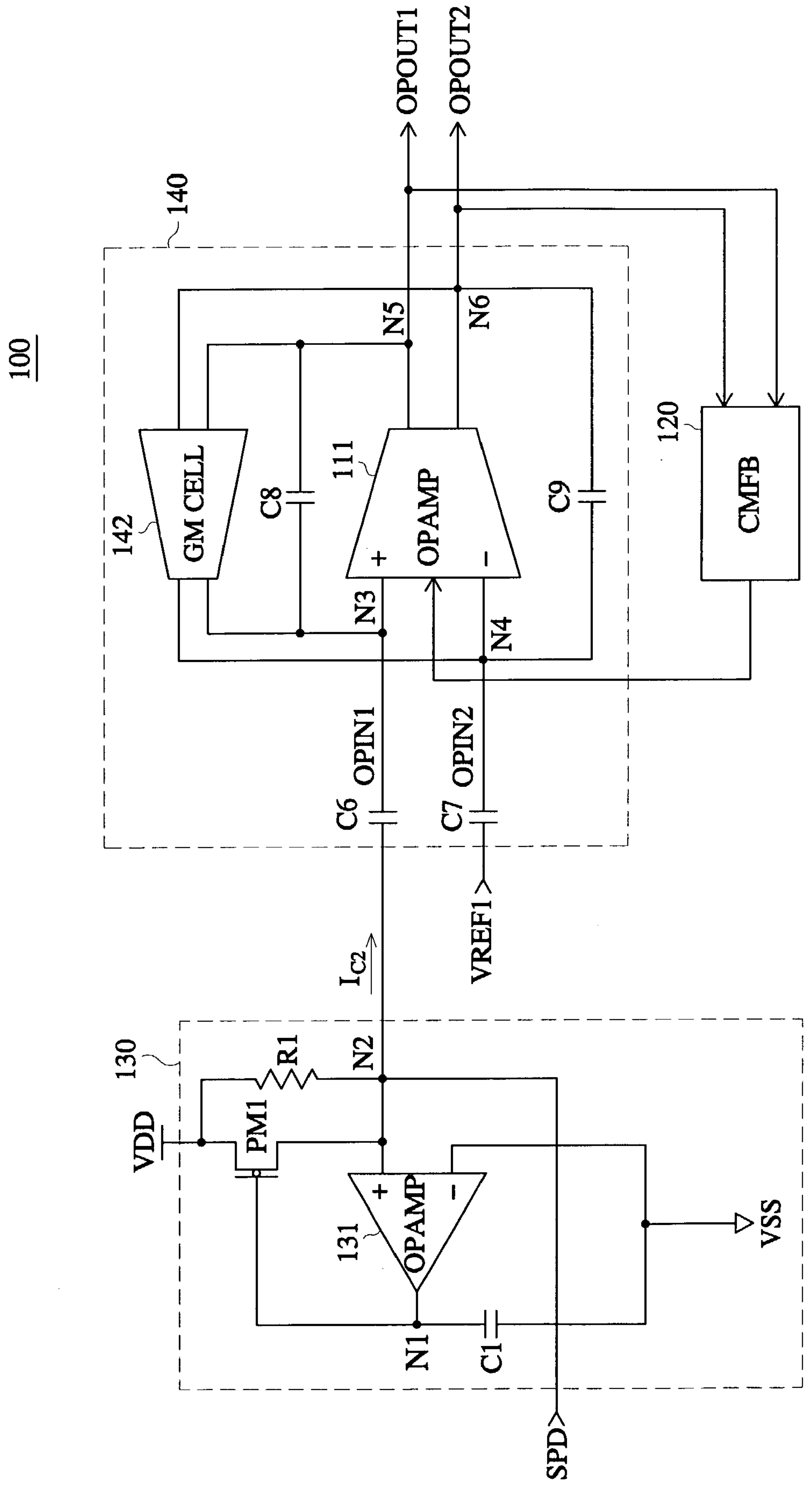
FIG. 7 is a circuit diagram of a semiconductor signal processing device of an IRCR in accordance with still further alternative embodiment of the present invention, wherein the semiconductor signal processing device has a high pass amplifier having a DC level adjusting circuit and a gm cell.

FIG. 7 illustrates a high pass amplifier with a DC level adjusting circuit and using a gm cell as a resistor. The amplifier of FIG. 7 includes all the elements shown in FIG. 6 and further includes a DC level adjusting circuit 130 arranged at an input stage of the amplifier shown in FIG. 6. Circuit configuration and the operation of DC level adjusting circuit 130 are described above with reference to FIG. 3, so that explanation about the DC level adjusting circuit 130 is omitted here with reference to FIG. 7.

Figure 8:
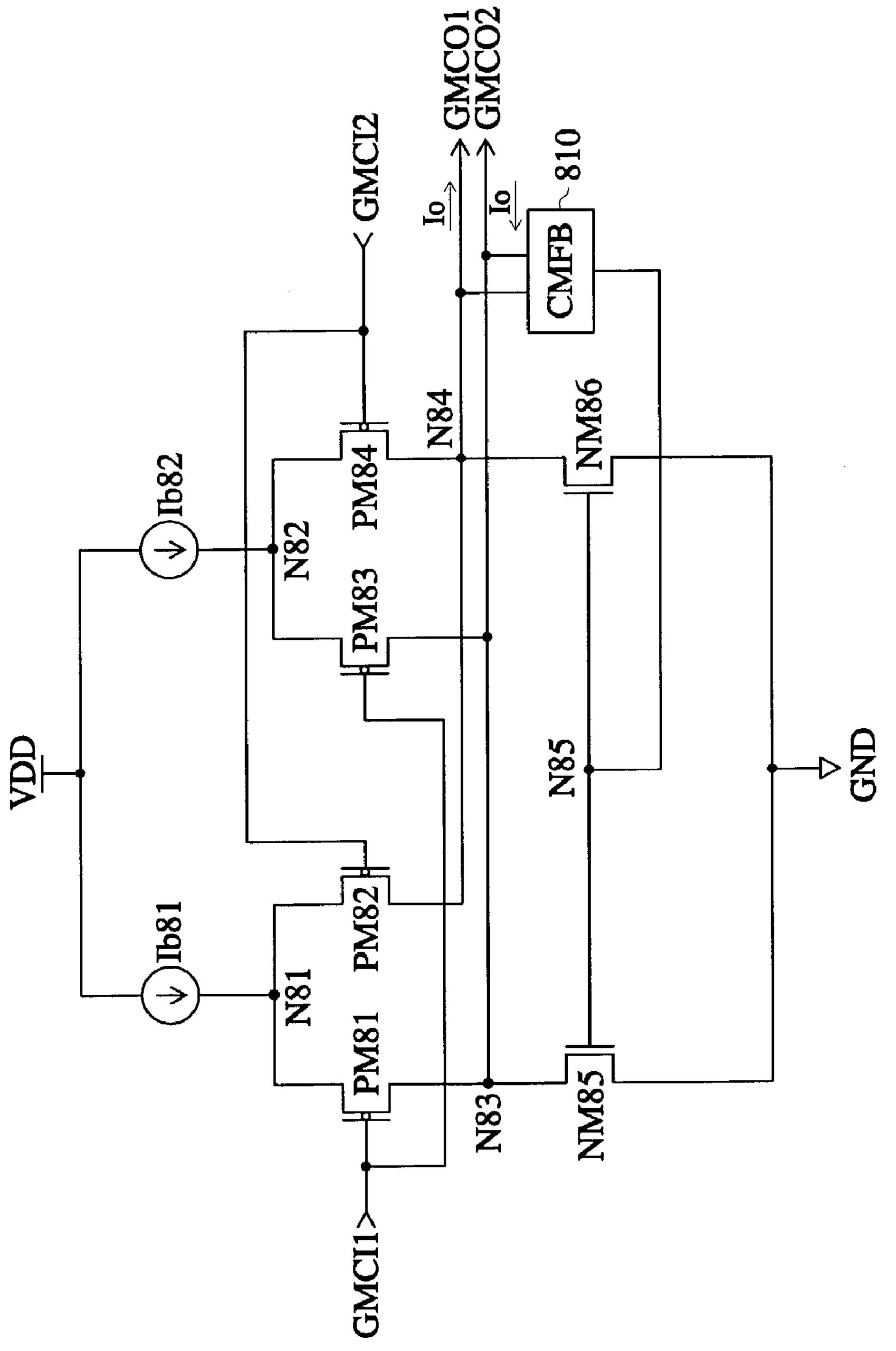
FIG. 8 is a circuit diagram of a gm cell in the high pass amplifier shown in FIG. 6 and FIG. 7.

FIG. 8 illustrates a gm cell used in the high pass amplifiers shown in FIG. 6 and FIG. 7.

The gm cell with reference to FIG. 8 comprises a current source Ib81 connected between a power supply voltage VDD and a node N81, a PMOS transistor PM81 with a source connected to the node N81, a drain connected to a node N83 and a gate to which a first input signal GMCI1 is applied, a PMOS transistor PM82 with a source connected to the node N81, a drain connected to a node N84 and a gate to which a second input signal GMCI1 is applied, a current source Ib82 connected between a power supply voltage VDD and the node N82, a PMOS transistor PM83 with a source connected to the node N82, a drain connected to the node N83 and a gate to which the first input signal GMCI1 is applied, a PMOS transistor PM84 with a source connected to the node N82, a drain connected to the node N84 and a gate to which the second input signal GMCI2 is applied, an NMOS transistor NM85 with a drain connected to the node N83, a source connected to a ground voltage GND and a gate connected to the node N85, an NMOS transistor NM86 with a drain connected to the node N84, a source connected to a ground GND and a gate connected to the node N85, and a common mode feed back circuit 810 which receives a first output signal GMCO1 and a second output signal GMCO2 from the node N84 and the node N83, respectively and generates a common mode feed back signal which is transmitted to the node N85.

In FIG. 8, the first input signal GMCI1 and the second input signal GMCI2 correspond to the first output signal OPOUT1 and the second output signal OPOUT2, respectively, of the operational amplifier 111 in FIG. 6 and FIG. 7.

Accordingly, the first output signal GMCO1 is transmitted to the node N3 in FIG. 6 and the second output signal GMCO2 is transmitted to the node N4 in FIG. 7. The gm cell shown in FIG. 8 generates a current Io which is proportional to signal difference between the first and second input signals GMCI1, GMCI2, and the current lo is expressed as an equation, Io=gm×(GMCI1−GMCI2).

In FIG. 6 and FIG. 7, respectively, assuming that the input stage of the operational amplifier 111 is in a virtual ground state and a resistor is used instead of the gm cell 142, a current flowing through the resistor is obtained by dividing the output voltage OPOUT1 by resistance of the resistor. If the resistor is replaced with a gm cell, an output current I of the gm cell is expressed as an equation, I=gm×OPOUT1. Here, even if the output voltage OPOUT1 is replaced with the output voltage OPOUT2, the output current I is the same. Accordingly, by using a gm cell as shown in FIG. 2, a resistor with high resistance of MΩ can be implemented.

Figure 9:
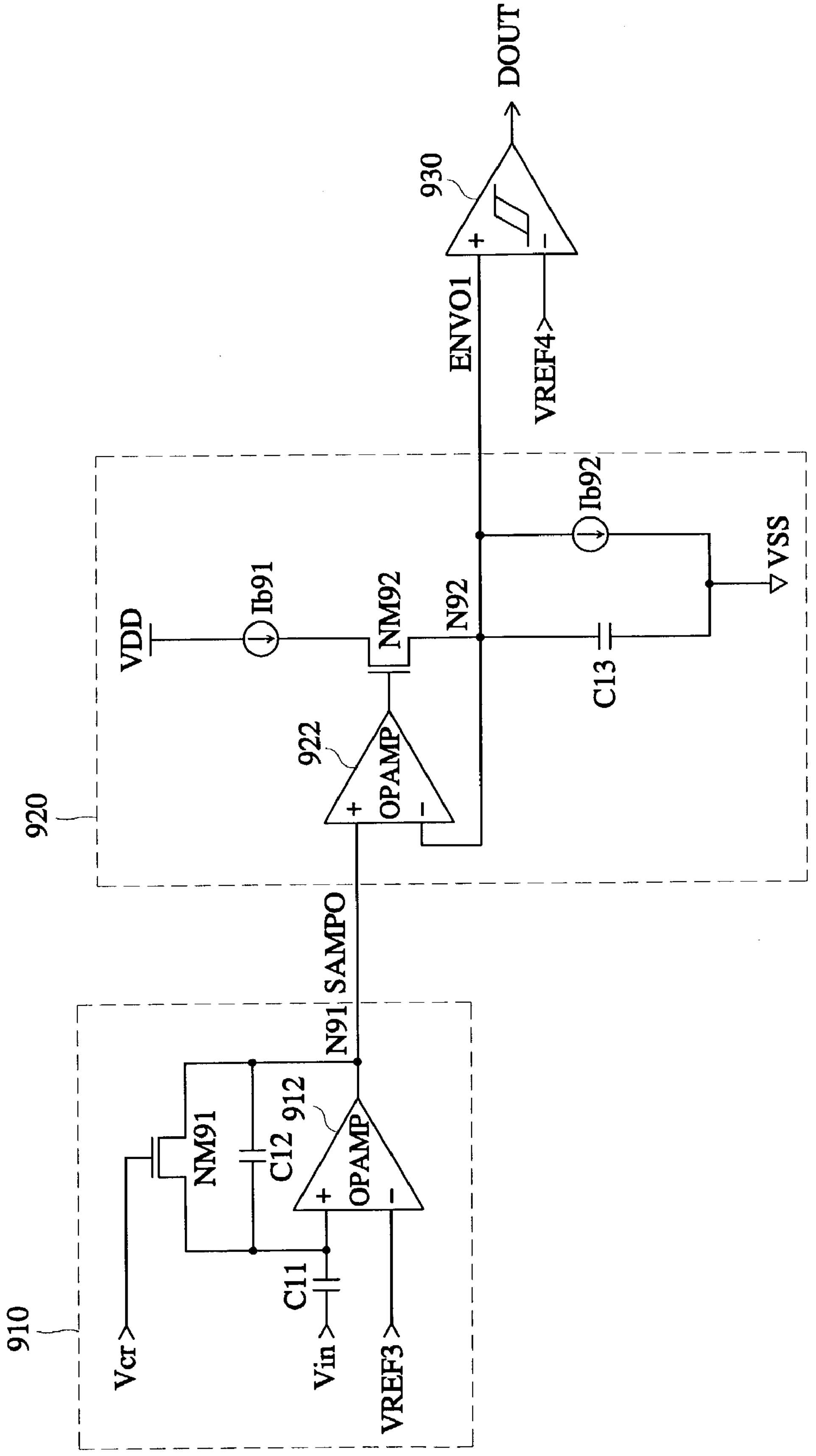
FIG. 9 is a circuit diagram of an envelope signal detecting circuit in accordance with a first example of the present invention.

FIG. 9 illustrates an envelope signal detecting circuit in accordance with a first embodiment of the present invention. FIG. 9 is a detailed circuit diagram of the envelope signal detecting circuit 400 shown in FIG. 2. Referring to FIG. 9, an envelope signal detecting circuit comprises a high pass amplifier 910, an envelope signal abstracting unit 920 and a comparator 930.

The high pass amplifier 910 comprises an operational amplifier 912 which has a first input terminal for receiving an input signal Vin through a capacitor C11 and a second input terminal for receiving a reference voltage VREF3, amplifies voltage difference between the input signal Vin and the reference voltage VREF3, generates and transmits its amplified output signals to a node N91. The high pass amplifier 910 further comprises a capacitor C12 connected between the first input terminal and an output terminal of the operational amplifier 912, and an NMOS transistor NM91 which has a gate to which a control voltage Vcr is applied and is connected between both ends of the capacitor C12.

The envelope signal abstracting unit 920 comprises an operational amplifier 922 having a first input terminal for receiving an output signal SAMPO of the high pass amplifier 910 and a second input terminal connected to a node N92, and for amplifying voltage difference between the output signal SAMPO of the high pass amplifier 910 and a first envelope signal EVNO1 which is a voltage of the node N91. The envelope signal abstracting unit 920 further comprises an NMOS transistor NM92 with a gate connected to the output terminal of the operational amplifier 922 and a source connected to the node N92, a current source Ib91 connected between a power supply voltage VDD and the drain of the NMOS transistor NM92 for supplying currents, a capacitor C13 connected between the node N92 and a ground voltage VSS and a current source Ib92 connected between the node N92 and a ground voltage VSS.

Figure 10:
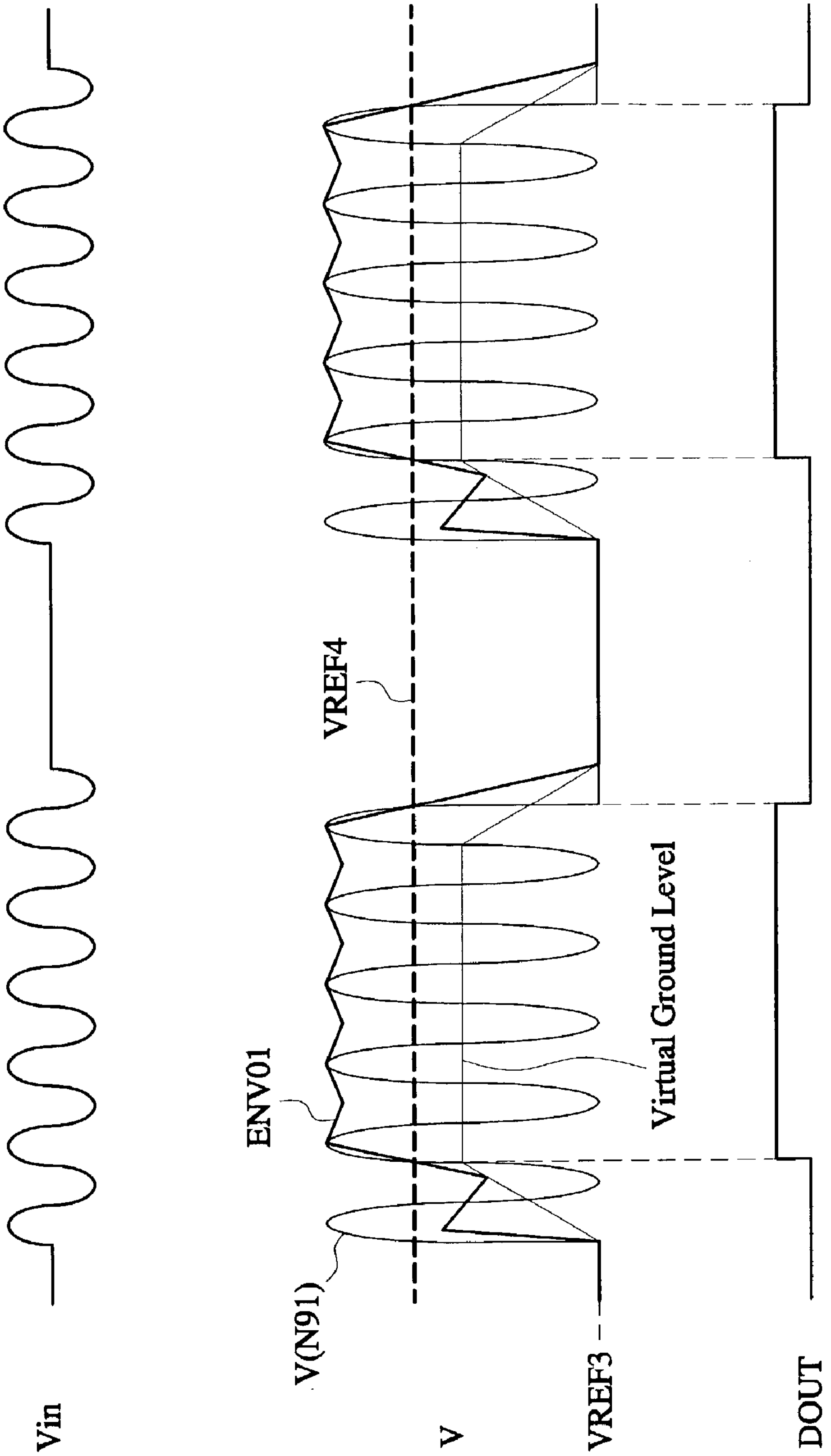
FIG. 10 illustrates waveforms of signals shown in FIG. 8.

FIG. 10 illustrates waveforms of respective signals shown in FIG. 9.

The operation of the envelope signal detecting circuit in accordance with a first embodiment of the present invention will be described below with reference to FIG. 9 and FIG. 10.

The high pass amplifier 910 is a characterized element of the present invention. The high pass amplifier 910 serves as a high pass filter and as an amplifier for amplifying an input signal Vin and generating an output signal SAMPO. Since a predetermined control voltage Vcr is applied to the gate of the NMOS transistor NM91, the NMOS transistor NM91 is operated both in a linear region and a saturation region.

Gain of the high pass amplifier 910 is determined by the capacitance ratio of the capacitor C11 to the capacitor C12. If resistance of the NMOS transistor NM91 is RM, high pass frequency is determined by the capacitors C11, C12 and the resistance RM of the NMOS transistor NM91. When the output signal SAMPO of the high pass amplifier 910, I.e. voltage of the node N91, is getting lowered than the reference voltage VREF3 input to the second input terminal of the operational amplifier 912, the NMOS transistor NM91 is turned on and the output signal SAMPO of the high pass amplifier 910 becomes the same level as the reference voltage VREF3. That is, a minimum voltage of the output signal SAMPO of the high pass amplifier 910 is not lowered below the reference voltage VREF3. As a result, as shown in FIG. 10, virtual ground, ac ground, level of the output signal SAMPO of the high pass amplifier 910 changes based on voltage level of the output signal SAMPO. Since, the virtual ground voltage increases by the high pass amplifier 910, even though low input signal is input, envelope signals detection efficiency is improved.

The envelope signal abstracting unit 920 receives the output signal SAMPO of the high pass amplifier 910 and generates a first envelope signal ENVO1. The operational amplifier 922 amplifies voltage difference between the output signal SAMPO of the high pass amplifier 910 and voltage of the node N91, and controls a current flowing through the NMOS transistor NM92. The current of the NMOS transistor NM92 charges a capacitor C13 and pulls up voltage of the node N92. The current source Ib92 determines discharging speed for discharging a voltage of the charged capacitor C13.

The comparator 930 receives the first envelope signal ENVO1, compares it with a reference voltage VREF4 and generates a pulse signal DOUT. As shown in FIG. 10, in the range that the first envelope signal ENVO1 is greater than the reference voltage VREF4, the pulse signal DOUT has a logic "high" level, and when the envelope signal ENVO1 is lower than the reference voltage VREF4, the pulse signal DOUT has a logic "low" level.

Figure 11:
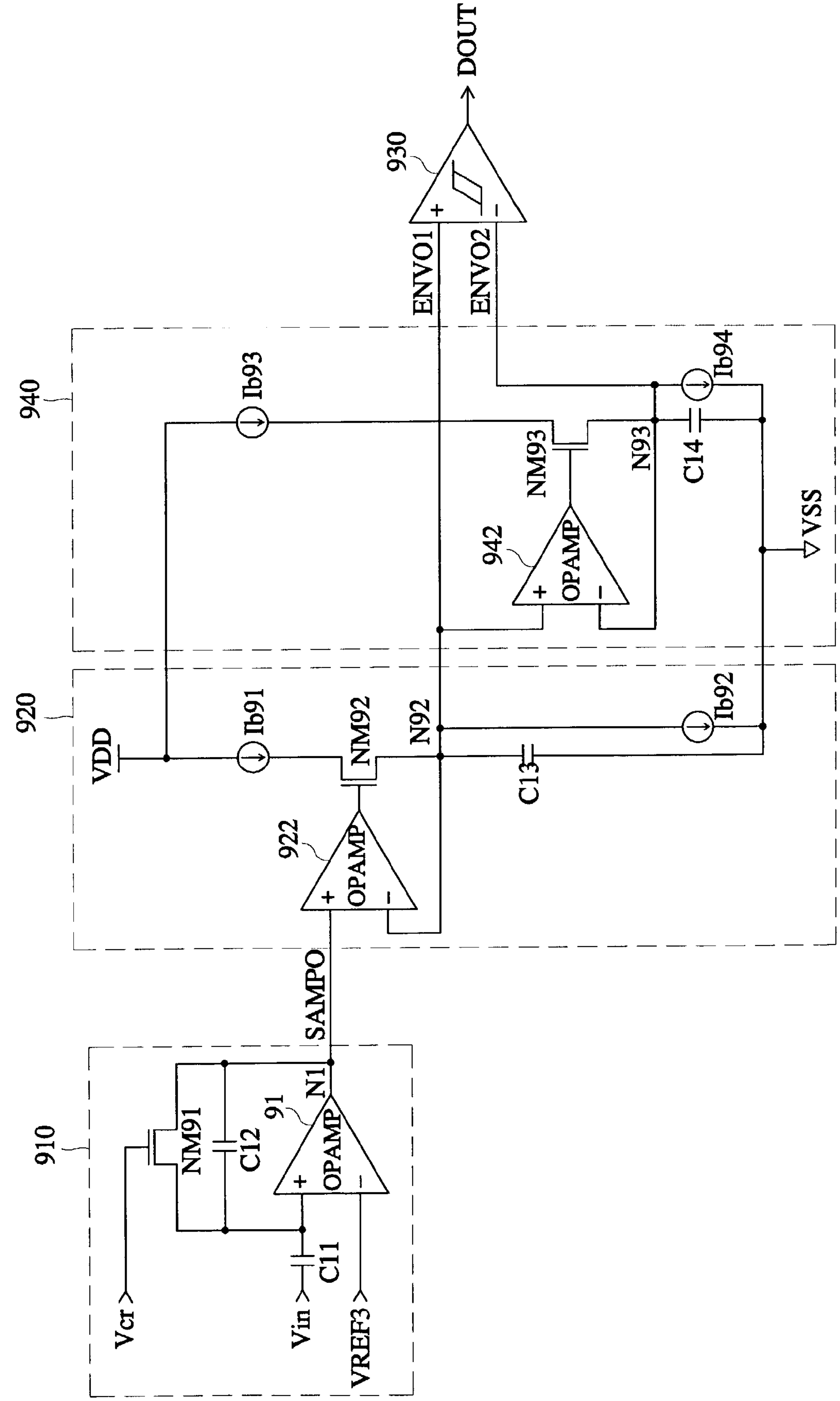
FIG. 11 is a circuit diagram of an envelope signal detecting circuit in accordance with a second example of the present invention.

FIG. 11 illustrates an envelope signal detecting circuit in accordance with a second embodiment of the present invention, wherein the envelope signal detecting circuit comprises a high pass amplifier 910, a first envelope signal abstracting element 920, a second envelope signal abstracting element 940 and a comparator 930. The high pass amplifier 910 comprises an operational amplifier 912 having a first input terminal for receiving an input signal Vin through a capacitor C11 and a second input terminal for receiving a reference voltage VREF3, amplifying voltage difference between the input signal Vin and the reference voltage VREF3 and outputting an output signal SAMPO to a node N91. The high pass amplifier 910 further comprises a capacitor C12 connected between the first input terminal and an output terminal of the operational amplifier 912, and an NMOS transistor NM91 connected between both ends of the capacitor C12 and having a gate to which a control voltage Vcr is applied.

The first envelope signal abstracting unit 920 comprises an operational amplifier 922 having a first input terminal for receiving the output signal SAMPO of the high pass amplifier 910 and a second input terminal connected to a node N92 and amplifying voltage difference between the output signal SAMPO of the high pass amplifier 910 and a voltage of the node N92, an NMOS transistor N92 with a gate connected to an output terminal of the operational amplifier 922 and a source connected to the node N92, a current source Ib91 connected between a power supply voltage VDD and a drain of the NMOS transistor N92 and supplying a current, a capacitor C13 connected between the node N92 and a ground voltage VSS and a current source Ib92 connected between the node N92 and a ground voltage VSS. The first envelope signal abstracting unit 920 generates a first envelope signal ENVO1 and transmits it to the node N92.

The second envelope signal abstracting unit 940 comprises an operation amplifier 942 having a first input terminal for receiving the first envelope signal EVNO1 output from the first envelope signal abstracting unit 920 and a second input terminal connected to a node N93, and amplifying voltage difference between the first envelope signal EVNO1 and a voltage of the node N93, an NMOS transistor NM93 with a gate connected to an output terminal of the operational amplifier 942 and a source connected to the node N93, a current source Ib93 connected between a power supply voltage VDD and a drain of the NMOS transistor NM93 and supplying a current, a capacitor C14 connected between the node N93 and a ground voltage VSS and a current source Ib94 connected between the node N93 and a ground voltage VSS. The second envelope signal abstracting unit 940 generates a second envelope signal ENVO2 and transmits it to the node N93.

Figure 12:
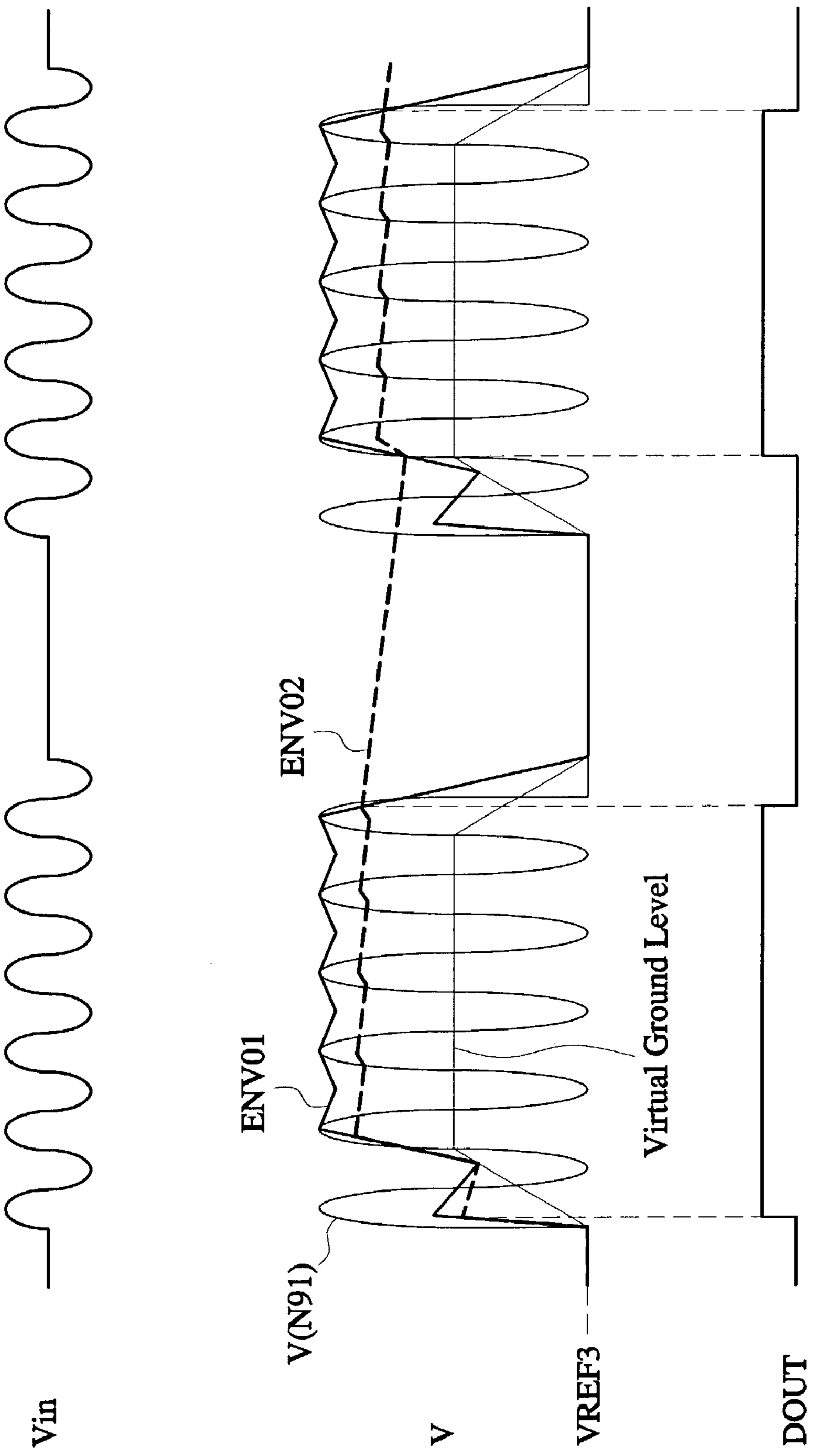
FIG. 12 illustrates waveforms of signals shown in FIG. 3.

FIG. 12 illustrates waveforms of signals shown in FIG. 11.

The operation of the envelope signal detecting circuit in accordance with the second embodiment of the present invention will be described below with reference to FIG. 11 and FIG. 12.

The high pass amplifier 910 operates in the same way as the high pass amplifier shown in FIG. 9. The first envelope signal abstracting unit 920 operates in the same way as the envelope signal abstracting unit 920 shown in FIG. 9. Accordingly, explanation about the operation of the high pass amplifier 910 and the first envelope signal abstracting unit 920 of the envelope signal detecting circuit in accordance with the second embodiment of the present invention will be omitted.

The second envelope signal abstracting unit 940 receives the first envelope signal ENVO1 which is an output signal of the first envelope signal abstracting unit 920, and generates a second envelope signal ENVO2. The operational amplifier 942 amplifies voltage difference between the first envelope signal ENVO1 and a voltage of the node N93 and control currents of the NMOS transistor NM93. The current of the NMOS transistor NM93 charges the capacitor C14 to pull up the voltage of the node N93. The current source Ib94 determines discharging speed of the charged capacitor C14.

The comparator 930 receives the first envelope signal ENVO1 and the second envelope signal ENVO2 as input signals, compares them and outputs a pulse signal DOUT. As shown in FIG. 12, when the first envelope signal ENVO1 has a voltage grater than a voltage of the second envelope signal ENVO2, the pulse signal DOUT has a logic “high” level, and when the first envelope signal ENVO1 has a voltage less an a voltage of the second envelope signal ENVO2, the pulse signal DOUT has a logic “low” level.

Since the envelope signal detecting circuit in accordance with the second embodiment of the present invention shown in FIG. 11 has the high pass amplifier 910, a minimum voltage of the output signal SAMPO of the high pass amplifier 910 is not lowered below the reference voltage VREF3. As a result, virtual ground level of the output signal SAMPO of the high pass amplifier 910 changes based on voltage level of the output signal SAMPO. Since the virtual ground voltage increases by the high pass amplifier 910, envelope signals detection efficiency is improved even when a low input signal is applied thereto.

On the other hand, distance between a remote control receiver and a remote control transmission device determines the size of a burst signal received by the remote control receiver. Accordingly, pulse width of the pulse signal DOUT, which is an output of the comparator, changes based on the distance between the receiver and transmission device. However, since the envelope signal detecting circuit in accordance with the second embodiment of the present invention uses the second envelope signal ENVO2, which is an output of the second envelope signal abstracting unit 940, as the reference voltage of the comparator 930, the pulse width of the pulse signal DOUT is constant.

As described above, the IRCR in accordance with the present invention has the signal processing device, which is designed using only CMOS process and has a good noise reduction characteristic. Further, the IRCR of the present invention may stably amplify input signals even if the input signals has a large current out of allowed ranges to be input to the amplifier. Further, the signal processing device has a smaller size than conventional semiconductor signal processing devices. The IRCR of the present invention includes an envelope signal detecting circuit with high envelope signals detection efficiency. The envelope signal detecting circuit in accordance with the present invention may stably generate a pulse signal even if a lower signal is input.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An infrared remote control receiver, comprising:

a photo diode for converting an optical signal to an electrical signal;

a semiconductor signal processing device for receiving the electrical signal output from the photo diode, eliminating noise components from the electrical signal output from the photo diode and generating a pulse signal corresponding to a remote control signal transmitted from a remote control transmission device; and a micro computer for receiving the pulse signal from the semiconductor signal processing device and performing a remote control operation instructed by a user of the remote control transmission device by decoding the received pulse signal, wherein the semiconductor signal processing device comprises:

an amplifier for receiving the output of the photo diode and amplifying the received output;

a variable gain amplifier for receiving an output of the amplifier and amplifying the noise components and original signal components in the received output signal from the amplifier with different gains;

a filter for passing carrier frequency components from an output signal of the variable gain amplifier circuit;

an envelope signal detecting circuit for abstracting envelope signals from the output of the filter;

a hysteresis comparator for comparing the envelope signals output from the envelope signal detecting circuit and generating the pulse signal corresponding to the remote control signal; and an automatic gain controller for receiving outputs of the envelope signal detecting circuit and separately transmitting a signal with the original signal components and a signal with the noise components to the variable gain amplifier circuit, wherein the amplifier comprises:

a first operational amplifier having a first input terminal connected to a first node, a second input terminal connected to a second node, and a third input terminal for receiving a common mode feed back signal, wherein the first operational amplifier amplifies signal difference between a high frequency signal input to the first input terminal and a reference signal input to the second input terminal, generates a first output signal and a second output signal and transmits the first and second output signals to a third node and a fourth node, respectively;

a first MOS transistor controlled by a predetermined voltage and connected in parallel to the third capacitor;

a second MOS transistor connected in parallel to the fourth capacitor and controlled by a predetermined voltage;

a DC level adjusting circuit for maintaining a voltage input to the input terminal of the amplifier to a predetermined level or greater when an external input signal out of allowed ranges is input to the input terminal of the amplifier, wherein the DC level adjusting circuit comprises:

a first PMOS transistor with a source to which a power supply voltage is applied, a gate connected to a fifth node and a drain connected to a sixth node;

a resistor with a first end connected to a power supply voltage and a second end connected to the sixth node;

a second operational amplifier for amplifying a voltage of the sixth node, the second operational amplifier having a first input terminal connected to the sixth node, a second input terminal connected to a ground voltage and an output terminal connected to the fifth node; and a first capacitor connected between the fifth node and a ground voltage, wherein an electrical signal is applied to the sixth node.

2. The infrared remote control receiver according to claim 1, wherein the amplifier further comprises:

a first capacitor having a first end for receiving the output signal of the photo diode and a second end connected to the first node;

a second capacitor having a first end for receiving a reference voltage and a second end connected to the second node;

a common mode feed back circuit for receiving the first output signal and the second output signal of the first operational amplifier from the third node and the fourth node, respectively, generating the common mode feed back signal and transmitting the common mode feed back signal to the third input terminal of the first operational amplifier;

the third capacitor connected between the first node and the third node; and the fourth capacitor connected between the second node and the fourth node.

3. The infrared remote control receiver according to claim 2, wherein the first operational amplifier comprises:

a third PMOS transistor with a source to which a power supply voltage is applied, a drain connected to a seventh node and a gate to which a first bias voltage is applied;

a fourth PMOS transistor with a source to which a power supply voltage is applied, a drain connected to an eighth node and a gate to which the first bias voltage is applied;

a third NMOS transistor with a drain connected to a seventh node, a source connected to a ninth node and a gate to which the first input signal is applied;

a fourth NMOS transistor with a drain connected to the eighth node, a source connected to the ninth node and a gate to which the second input signal is applied;

a first current source connected between the ninth node and a ground voltage;

a fifth PMOS transistor with a source connected to the seventh node, a gate connected to an eleventh node and a drain connected to a tenth node;

a sixth PMOS transistor with a source connected to the eighth node, a gate and a drain which are commonly connected to the eleventh node;

a fifth NMOS transistor with a drain connected to the tenth node and a gate to which a second bias voltage is applied;

a seventh NMOS transistor with a drain connected to the source of the fifth NMOS transistor, a source connected to a ground voltage and a gate connected to a twelfth node;

a sixth NMOS transistor with a drain connected to the eleventh node and a gate to which the second bias voltage is applied; and an eighth NMOS transistor with a drain connected to the source of the sixth NMOS transistor, a source connected to a ground voltage and a gate connected to the twelfth node, wherein the common mode feed back signal is applied to the twelfth node, the first output signal is output from the tenth node and the second output signal is output from the eleventh node.

4. The infrared remote control receiver according to claim 2, wherein the common mode feed back circuit comprises:

a common mode signal generator which comprises a seventh PMOS transistor with a source connected to a power supply voltage, a gate and a drain commonly connected to a thirteenth node, an eighth PMOS transistor with a source connected to a power supply voltage, a gate connected to the thirteenth node and a drain connected to a fourteenth node, a ninth NMOS transistor with a drain connected to the thirteenth node, a source connected to a fifteenth node and a gate to which the first output signal of the first operational amplifier is applied, a tenth NMOS transistor with a gate and a drain commonly connected to the fourteenth node and a source connected to the fifteenth node, a second current source connected between the fifteenth node and a ground voltage, an eleventh NMOS transistor with a gate and a drain commonly connected to the fourteenth node and a source connected to a sixteenth node, a twelfth NMOS transistor with a drain connected to the thirteenth node, a source connected to the sixteenth node and a gate to which the second output signal of the second operational amplifier is applied, and a third current source connected between the sixteenth node and a ground voltage, for outputting a common mode output signal from the fourteenth node, and a common mode amplifier which comprises a fourth current source connected between a power supply voltage and a seventeenth node, a ninth PMOS transistor with a source connected to the seventeenth node and a gate connected to the fourteenth node a thirteenth NMOS transistor with a gate and a drain commonly connected to the drain of the ninth PMOS transistor and a source connected to a ground voltage, a tenth PMOS transistor with a source connected to the seventeenth node, a drain connected to an eighteenth node and a gate to which a second reference voltage is applied, and a fourteenth NMOS transistor with a gate and a drain commonly connected to the drain of the tenth PMOS transistor and a source connected to a ground voltage, for generating the common mode feed back signal from the fourteenth node.

5. An infrared remote control receiver, comprising:

a photo diode for converting an optical signal to an electrical signal;

a semiconductor signal processing device for receiving the electrical from the photo diode, eliminating noise components from the electrical signal output from the photo diode and generating a pulse signal corresponding to a remote control signal transmitted from a remote control transmission device; and a micro computer for receiving the pulse signal from the semiconductor signal processing device and performing a remote control operation instructed by a user of the remote control transmission device by decoding the received pulse signal, wherein the semiconductor signal processing device comprises:

an amplifier for receiving the output of the photo diode and amplifying the received output;

a variable gain amplifier for receiving an output of the amplifier and amplifying the noise components and original signal components in the received output signal from the amplifier with different gains;

a filter for passing carrier frequency components from an output signal of the variable gain amplifier circuit;

an envelope signal detecting circuit for abstracting envelope signals from the output of the filter;

a hysteresis comparator for comparing the envelope signals output from the envelope signal detecting circuit and generating the pulse signal corresponding to the remote control signal; and an automatic gain controller for receiving outputs of the envelope signal detecting circuit and separately transmitting a signal with the original signal components and a signal with the noise components to the variable gain amplifier circuit, wherein the amplifier comprises:

a first operational amplifier having a first input terminal connected to a first node, a second input terminal connected to a second node and a third input terminal receiving a common mode feed back signal, wherein the first operational amplifier amplifies signal difference between a high frequency signal input to the first input terminal and a reference signal input to the second input terminal, and generates first and second output signals and transmits the first and second output signals to third and fourth nodes, respectively;

a gm cell having a first input terminal connected to the third node, a second input terminal connected to the fourth node, a first output terminal connected to the first node and a second output terminal connected to the second node; and a DC level adjusting circuit for maintaining a voltage of the input terminal of the amplifier to a predetermined voltage or greater when an external input signal out of allowed ranges is input to the input terminal of the amplifier, wherein the DC level adjusting circuit comprises:

a first PMOS transistor with a source to which a power supply voltage is applied, a gate connected to a fifth node and a drain connected to a sixth node;

a resistor with a first end connected to a power supply voltage and a second end connected to the sixth node;

a second operational amplifier for amplifying a voltage of the sixth node, the second operational amplifier having a first input terminal connected to the sixth node, a second input terminal connected to a ground voltage and an output terminal connected to the fifth node; and a first capacitor connected between the fifth node and a ground voltage, wherein an electrical signal is applied to the sixth node.

6. The infrared remote control receiver according to claim 5, wherein the amplifier further comprises a first capacitor having a first end receiving the output signal of the photo diode and a second end connected to the first node;

a second capacitor having a first end receiving a reference voltage and a second end connected to the second node;

a common mode feed back circuit for receiving the first output signal of the first operational amplifier from the third node, receiving the second output signal of the first operational amplifier from the fourth node, generating the common mode feed back signal and transmitting the common mode feed back signal to the third input terminal of the first operational amplifier;

a third capacitor connected to the first node and the third node;

a fourth capacitor connected between the second node and the fourth node.

7. The infrared remote control receiver according to claim 5, wherein the gm cell comprises;

a first current source connected between a power supply voltage and a first node;

a first PMOS transistor with a source connected to the first node, a drain connected to a third node and a gate to which a first input signal is applied;

a second PMOS transistor with a source connected to the first node, a drain connected to a fourth node and a gate to which a second input signal is applied;

a second current source connected between a power supply voltage and a second node;

a third PMOS transistor with a source connected to the second node, a drain connected to the third node and a gate to which the first input signal is applied;

a fourth PMOS transistor with a source connected to the second node, a drain connected to the fourth node and a gate to which the second input signal is applied;

a first NMOS transistor with a drain connected to the third node, a source connected to a ground voltage and a gate connected to a fifth node;

a second NMOS transistor with a drain connected to the fourth node, a source connected to a ground voltage and a gate connected to the fifth node; and a common mode feed back circuit for receiving first and second output signals from the fourth and third nodes, respectively, generating a common mode feed back signal and transmitting the common mode feed back signal to the fifth node.

8. An envelope signal detecting circuit comprising:

an amplifier for amplifying an input signal;

an envelope signal abstracting unit for generating a first envelope signal after receiving an output signal of the amplifier, and a comparator for receiving an output signal of the envelope signal abstracting unit, comparing the output signal with a second reference voltage and generating a pulse signal, wherein the amplifier comprises a first operational amplifier having a first input terminal and a second input terminal connected to the first reference voltage, for amplifying voltage difference between the input signal and the first reference voltage, a first MOS transistor having a gate to which a control voltage is applied, wherein the envelope signal abstracting unit comprises a second operational amplifier having a first input terminal receiving an output signal of the amplifier and a second input terminal connected to a second node, for amplifying voltage difference between the output signal of the amplifier and the first envelope signal, a second MOS transistor with a gate connected to the output terminal of the second operational amplifier and a source connected to the second node, wherein a minimum voltage level of the output signal of the amplifier is maintained to a voltage level greater than a first reference voltage.

9. The envelope signal detecting circuit according to claim 8, wherein the amplifier further comprises:

a first capacitor having a first end receiving an input signal and a second end connected to the first input terminal of the first operational amplifier;

a second capacitor connected between the first input terminal of the first operational amplifier and an output terminal of the first operational amplifier.

10. The envelope signal detecting circuit according to claim 8, wherein the envelope signal abstracting unit further comprises:

a first current source connected between a power supply voltage and a drain of the second MOS transistor;

a third capacitor connected between the second node and a ground voltage; and a second current source connected between the second node and a ground voltage.

11. An envelope signal detecting circuit comprising:

an amplifier for amplifying an input signal;

a first envelope signal abstracting unit for generating a first envelope signal by receiving an output signal of the amplifier;

a second envelope signal abstracting unit for generating a second envelope signal by receiving an output of the first envelope signal abstracting unit; and a comparator for comparing the output signal of the first envelope signal abstracting unit and an output signal of the second envelope signal abstracting unit, and generating a pulse signal, wherein the amplifier comprises a first operational amplifier having a first input terminal and a second input terminal receiving the first reference voltage, for amplifying voltage difference between the input signal and the first reference voltage, a first MOS transistor having a gate to which a control voltage is applied, wherein the first envelope signal abstracting unit comprises a third operational amplifier having a first input terminal receiving an output signal of the first envelope signal abstracting unit and a second input terminal connected to a third node, for amplifying voltage difference between the output signal of the first envelope signal abstracting unit and a voltage of the third node;

a third MOS transistor with a gate connected to an output terminal of the third operational amplifier and a source connected to the third node, wherein the second envelope signal abstracting unit comprises a third operational amplifier having a first input terminal receiving an output signal of the first envelope signal abstracting unit and a second input terminal connected to a third node, for amplifying voltage difference between the output signal of the first envelope signal abstracting unit and a voltage of the third node;

a third MOS transistor with a gate connected to an output terminal of the third operational amplifier and a source connected to the third node, wherein the minimum voltage of the output signal of the amplifier is greater than a first reference voltage.

12. The envelope signal detecting circuit according to claim 11, wherein the amplifier further comprises:

a first capacitor having a first end receiving an input signal and a second end connected to the first input terminal of the first operational amplifier; and a second capacitor connected between the first input terminal and an output terminal of the first operational amplifier.

13. The envelope signal detecting circuit according to claim 11, wherein the first envelope signal abstracting unit further comprises:

a first current source connected between a power supply voltage and a drain of the second MOS transistor;

a third capacitor connected between the second node and a ground voltage; and a second current source connected between the second node and a ground voltage.

14. The envelope signal detecting circuit according to claim 11, wherein the second envelope signal abstracting unit further comprises:

a third current source connected between a power supply voltage and a drain of the third MOS transistor, for supplying a current;

a fourth capacitor connected between the third node and a ground voltage; and a fourth current source connected between the third node and a ground voltage.

* * * * *